(12) United States Patent
Sun et al.

(10) Patent No.: US 12,235,544 B2
(45) Date of Patent: Feb. 25, 2025

(54) DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Chengxiao Sun, Guangdong (CN); Miao Zhou, Guangdong (CN); Lixuan Chen, Guangdong (CN); Zhenxia Chen, Guangdong (CN); Song Lan, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/620,671

(22) PCT Filed: Dec. 9, 2021

(86) PCT No.: PCT/CN2021/136633
§ 371 (c)(1),
(2) Date: Dec. 17, 2021

(87) PCT Pub. No.: WO2023/092668
PCT Pub. Date: Jun. 1, 2023

(65) Prior Publication Data
US 2024/0045270 A1    Feb. 8, 2024

(30) Foreign Application Priority Data

Nov. 25, 2021 (CN) .......................... 202111408950.4

(51) Int. Cl.
*G02F 1/1335*      (2006.01)

(52) U.S. Cl.
CPC .. *G02F 1/133614* (2021.01); *G02F 1/133536* (2013.01); *G02F 1/133607* (2021.01); *G02F 2202/28* (2013.01)

(58) Field of Classification Search
CPC ......... G02F 1/133614; G02F 1/133536; G02F 1/133607; G02F 2202/28
See application file for complete search history.

(56) References Cited

U.S. PATENT DOCUMENTS

2006/0077322 A1*   4/2006  Chuang .................... G02B 5/04
                                                                 349/113
2016/0070053 A1*   3/2016  Hwang .................... C08K 9/04
                                                                 362/330
(Continued)

FOREIGN PATENT DOCUMENTS

CN     203413546 U     1/2014
CN     109445011 A     3/2019
(Continued)

OTHER PUBLICATIONS

International Search Report in International application No. PCT/CN2021/136633, mailed on Aug. 23, 2022.
(Continued)

*Primary Examiner* — James A Dudek
(74) *Attorney, Agent, or Firm* — PV IP PC; Wei Te Chung

(57) ABSTRACT

The present application provides a display device. The display device comprises a quantum dot composite film, a liquid crystal display panel and a backlight module. The quantum dot composite film comprises a quantum dot film layer, and a light emerging surface of the quantum dot film layer is provided with a plurality of first prism structures. The first prism structure is employed to reduce an angle at which light emerges from the quantum dot film layer, thereby improving the front view brightness of the display (Continued)

device, and improving or avoiding the problem of light leakage of the display device in the large viewing angle of the dark state.

17 Claims, 13 Drawing Sheets

(56) References Cited

U.S. PATENT DOCUMENTS

| | | | |
|---|---|---|---|
| 2016/0291239 | A1 | 10/2016 | Lee et al. |
| 2016/0363709 | A1* | 12/2016 | Lee .................. G02B 6/0065 |
| 2019/0070833 | A1* | 3/2019 | Machida ................ B32B 25/14 |
| 2020/0110304 | A1 | 4/2020 | Lee et al. |
| 2021/0333637 | A1* | 10/2021 | Song ................ G02F 1/133603 |

FOREIGN PATENT DOCUMENTS

| | | |
|---|---|---|
| CN | 109739051 A | 5/2019 |
| CN | 209514115 U | 10/2019 |
| CN | 111458930 A | 7/2020 |
| CN | 113296312 A | 8/2021 |
| JP | 2007218984 A | 8/2007 |
| JP | 2009169004 A | 7/2009 |
| JP | 2011150077 A | 8/2011 |
| JP | 201722059 A | 1/2017 |
| JP | 202079920 A | 5/2020 |
| KR | 20160117848 A | 10/2016 |

OTHER PUBLICATIONS

Written Opinion of the International Search Authority in International application No. PCT/CN2021/136633, mailed on Aug. 23, 2022.
Chinese Office Action issued in corresponding Chinese Patent Application No. 202111408950.4 dated Jun. 22, 2022, pp. 1-8.
Japanese Office Action issued in corresponding Japanese Patent Application No. 特願2021-576415 dated Jan. 23, 2024, pp. 1-8.

* cited by examiner

DISPLAY DEVICE

FIELD OF THE INVENTION

The present invention relates to a display technology field, and more particularly to a display device.

BACKGROUND OF THE INVENTION

At present, due to the excellent properties of quantum dot material (QD), such as high color purity and continuous adjustable spectrum, it has become the most excellent luminescent material in the 21st century, which can greatly improve the color performance of existing liquid crystal display (LCD) panels in the display color gamut, so its display applications have been widely studied in recent years.

The existing quantum dot wide viewing angle display technology is to bond the quantum dot composite film to the prism, and utilize the property of the quantum dot to emerge light with a large viewing angle to improve the brightness of the liquid crystal display panel. However, due to the excessive diffusion of the viewing angle, this solution still emerges more light in the super-large viewing angle (>60°) range, resulting in insufficient front-view brightness of the liquid crystal display panel, and the light leakage is serious and the contrast is obviously low in the large viewing angle of the dark state.

In summary, the existing display device has the problems of insufficient formal brightness due to still more emerged light in the large viewing angle, and the light leakage in the large viewing angle of the dark state. Therefore, there is a need to provide a display device to improve this defect.

SUMMARY OF THE INVENTION

The embodiment of the present application provides a display device to solve the problems of insufficient formal brightness in the existing display device due to still more emerged light in the large viewing angle, and the light leakage in the large viewing angle of the dark state.

The embodiment of the present application provides a display device, comprising:
 a backlight module;
 a liquid crystal display panel arranged on a light emerging side of the backlight module; and
 a quantum dot composite film arranged between the liquid crystal display panel and the backlight module, wherein the quantum dot composite film comprises:
 a quantum dot film; and
 a plurality of first prism structures arranged on a light emerging surface of the quantum dot film layer.

According to one embodiment of the present application, a cross section of the first prism structures is a triangle or a trapezoid.

According to one embodiment of the present application, the plurality of first prism structures are distributed continuously or distributed at intervals along a first direction on the light emerging surface of the quantum dot film layer.

According to one embodiment of the present application, the quantum dot composite film further comprises a reflective polarizer, and the reflective polarizer is disposed on a side of the first prism structures away from the quantum dot film layer.

According to one embodiment of the present application, the quantum dot composite film further comprises a first optical film layer disposed on a side of the first prism structures away from the quantum dot film layer;
 wherein a surface of the first optical film layer away from the quantum dot film layer comprises a plurality of second prism structures.

According to one embodiment of the present application, the plurality of second prism structures are distributed continuously or distributed at intervals along a second direction on a side of the first optical film layer away from the quantum dot film layer, and the first direction is parallel to or intersects with the second direction.

According to one embodiment of the present application, a distance between adjacent second prism structures is greater than 0 μm, and less than or equal to 100 μm.

According to one embodiment of the present application, a cross section of the second prism structures is a triangle or a trapezoid.

According to one embodiment of the present application, a bottom angle of each second prism structure is the same, and the bottom angle of the second prism structure is greater than or equal to 20°, and less than or equal to 80°.

According to one embodiment of the present application, the second prism structures comprise a plurality of first sub-prism structures and a plurality of second sub-prism structures, and the second sub-prism structure is interspersedly arranged between the first sub-prism structures or arranged on a side of the first sub-prism structure;
 wherein a bottom angle of the first sub-prism structure is different from a bottom angle of the second sub-prism structure; and/or a cross section of the first sub-prism structure is different from a cross section of the second sub-prism structure.

According to one embodiment of the present application, the bottom angle of the first sub-prism structure is greater than the bottom angle of the second sub-prism structure.

According to one embodiment of the present application, the bottom angle of the first sub-prism structure is greater than 45°, and less than or equal to 80°, and the bottom angle of the second sub-prism structure is greater than or equal to 10°, and less than or equal to 45°.

According to one embodiment of the present application, the reflective polarizer is arranged on a side of the first optical film layer away from the quantum dot film layer.

According to one embodiment of the present application, a material of the first prism structure comprises transparent polymer and inorganic particles.

According to one embodiment of the present application, the transparent polymer comprises at least one of polymethyl methacrylate, polycarbonate, polyester resin or epoxy resin, and the inorganic particles comprise at least one of $TiO_2$, $BaSO_4$ and $ZrO_2$.

According to one embodiment of the present application, a refractive index of the first prism structure is greater than or equal to 1.3, and less than or equal to 1.7.

According to one embodiment of the present application, the quantum dot film layer comprises a composite film substrate and a plurality of quantum dots distributed in the composite film substrate;
 wherein a material of the composite film substrate comprises transparent polymer.

According to one embodiment of the present application, a material of the transparent polymer comprises at least one of polymethyl methacrylate, polycarbonate, polyester resin or epoxy resin, and the quantum dot comprises a luminescent core and an inorganic protective shell layer encapsulating the luminescent core;

wherein a material of the inorganic protective shell layer comprises at least one of CdS, ZnSe, ZnCdS2, ZnS and ZnO.

According to one embodiment of the present application, the quantum dots comprise red light quantum dots and green light quantum dots;

wherein a material of the luminescent core of the red light quantum dots comprises at least one of CdSe, Cd2SeTe and InAs, and a material of the luminescent core of the green light quantum dots comprises at least one of ZnCdSe2, InP and Cd2SSe.

According to one embodiment of the present application, the quantum dot composite film is attached to a side of the liquid crystal display panel facing the backlight module; or the quantum dot composite film is attached to a side of the backlight module facing the liquid crystal display panel.

The benefits of the embodiment of the present application are: The embodiment of the present application provides a display device. The display device comprises a quantum dot composite film, a liquid crystal display panel and a backlight module. The quantum dot composite film comprises a quantum dot film layer, and a light emerging surface of the quantum dot film layer is provided with a plurality of first prism structures. The refraction of light by the first prism structure is employed to reduce the emerging angle of light from the light emerging surface of the quantum dot film layer, thereby improving the front view brightness of the display device, and improving or avoiding the problem of light leakage of the display device in the large viewing angle of the dark state for improving the contrast of the display device.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

Figure 1:
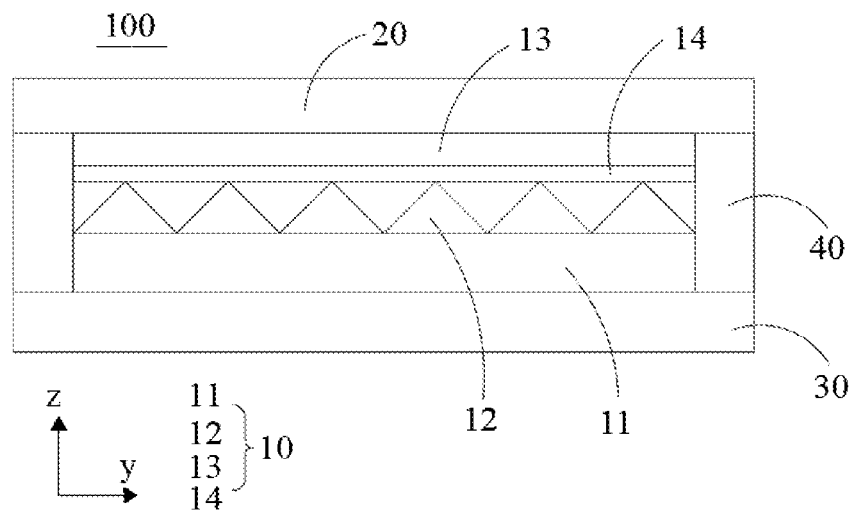
FIG. 1 is a structural diagram of a first embodiment of a display device provided by an embodiment of this application.

The following descriptions for the respective embodiments are specific embodiments capable of being implemented for illustrations of the present application with referring to appended figures. The terms of up, down, front, rear, left, right, interior, exterior, side, etcetera in the present application are merely directions of referring to appended figures. Thus, the used directional terms are used to describe and understand the present application, but the present invention is not limited thereto. In the figure, units with similar structures are denoted by the same reference numerals.

The present disclosure will be further described in detail with the accompanying drawings and the specific embodiments.

The embodiment of this application provides a display device. As shown in FIG. 1, FIG. 1 is a structural diagram of a first embodiment of a display device provided by an embodiment of this application. The display device 100 comprises a liquid crystal display panel 20, a backlight module 30 and a quantum dot composite film 10. The liquid crystal display panel 20 is arranged on a light emerging side of the backlight module 30. The quantum dot composite film 10 is arranged between the liquid crystal display panel 20 and the backlight module 30.

In the embodiment of the present application, the display device 100 may be a mobile terminal, such as a smart phone, a tablet computer, a notebook computer, etc.

The display device 100 may also be a wearable terminal, such as a smart watch, a smart bracelet, smart glasses, and an augmented reality equipment, etc. The display device 100 may also be a fixed terminal, such as a desktop computer, a television and the like.

In the embodiment of the present application, the types of the liquid crystal display panel 20 comprise, but are not limited to, VA type, IPS type, TN type and the like.

As shown in FIG. 1, the quantum dot composite film 10 comprises a quantum dot film layer 11 and a plurality of first prism structures 12. The first prism structures 12 are arranged on a light emerging surface of the quantum dot film layer 11.

The quantum dot film layer 11 comprises a composite film substrate and a plurality of quantum dots uniformly dispersed in the composite film substrate. The material of the composite film substrate comprises a transparent polymer material, and the transparent polymer material comprises one or more of polyester resin (PET), polymethyl methacrylate (PMMA) and polycarbonate (PC).

The quantum dot comprises a luminescent core and an inorganic protective shell layer encapsulating the luminescent core. The plurality of quantum dots comprise red light quantum dots and green light quantum dots. The material of the luminescent core of the red light quantum dots comprises at least one of CdSe, Cd2SeTe and InAs, and the material of the luminescent core of the green light quantum dots comprises at least one of ZnCdSe2, InP and Cd2SSe.

The material of the inorganic protective shell layer comprises one or more combinations of CdS, ZnSe, ZnCdS2, ZnS and ZnO. The material of the inorganic protective shell layer may further comprise high-stability composite quantum dots and perovskite quantum dots, etc. The high-stability composite quantum dots comprise hydrogel state quantum dot structures or CdSe—SiO2.

The material of the first prism structure 12 comprises transparent polymer and inorganic particles. The inorganic particles are uniformly dispersed in the transparent polymer. The material of the transparent polymer comprises a combination of at least one or more of polymethyl methacrylate (PMMA), polycarbonate (PC), polyester resin (PET) or epoxy resin (EP), and the material of the inorganic particles comprise a combination of at least one or more of TiO2, BaSO4 and ZrO2.

In the embodiment of this application, the transparent polymer material mixed with inorganic particles can be directly coated on the light emerging surface of the quantum dot film layer 11, and then the transparent polymer material is imprinted to form an uneven surface. After the transparent polymer material to be imprinted is cured, the first prism structures 12 can be formed on the surface of the quantum dot film layer 11.

Furthermore, the quantum dot composite film 10 further comprises a reflective polarizer 13, and the reflective polarizer 13 is disposed on a side of the first prism structures 12 away from the quantum dot film layer 11.

In one embodiment, as shown in FIG. 1, the reflective polarizer 13 is attached to the surface of the first prism structures 12 away from the quantum dot film layer 11 through the first transparent adhesive layer 14. The side of the quantum dot film layer 11 of the quantum dot composite film 10 away from the first prism structures 12 is attached to the side of the backlight module 30 facing the liquid crystal display panel 20.

Specifically, the thickness of the first transparent adhesive layer 14 is 4 µm. In practical applications, the thickness of the first transparent adhesive layer 14 is not limited to 4 µm, but can also be 2 µm, 3 µm, 5 µm, etc., and only needs to be greater than or equal to 2 µm, and less than or equal to 5 µm.

In the embodiment shown in FIG. 1, the quantum dot composite film 10 is attached to the backlight module 30, and the liquid crystal display panel 20 and the frame area of the backlight module 30 are attached by the sealant 40. Therefore, it is not necessary to attach the reflective polarizer 13 to the liquid crystal display panel 20. By attaching the quantum dot composite film 10 to the backlight module 30, the light efficiency of the backlight module can be effectively improved, thereby enhancing the brightness of the display device.

Figure 2:
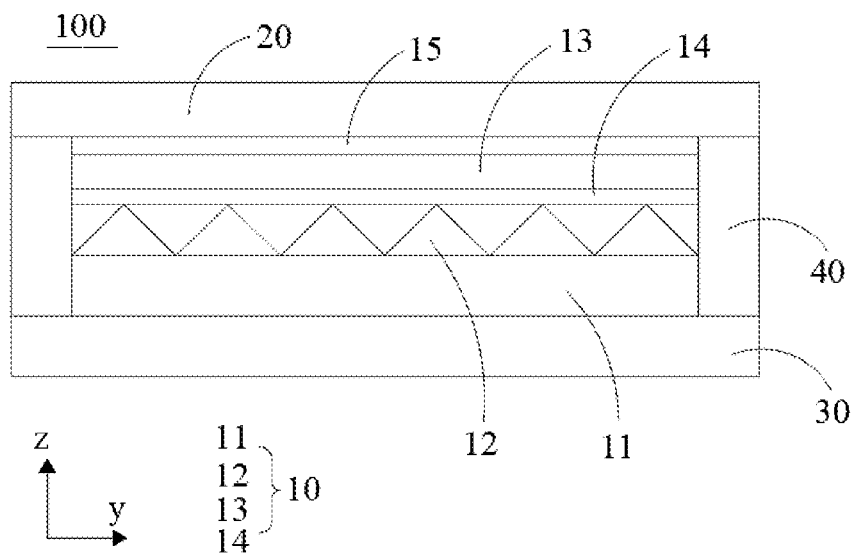
FIG. 2 is a schematic structural diagram of a second embodiment of a display device provided by an embodiment of this application.

In one embodiment, as shown in FIG. 2, FIG. 2 is a schematic structural diagram of a second embodiment of a display device provided by an embodiment of this application. The reflective polarizer 13 is attached to the surface of the first prism structures 12 away from the quantum dot film layer 11 through the first transparent adhesive layer 14. The surface of the reflective polarizer 13 away from the first prism structures 12 is attached to the surface of the liquid crystal display panel 20 facing the backlight module 30 through the second transparent adhesive layer 15.

In the embodiment shown in FIG. 2, the liquid crystal display panel 20 and the frame area of the backlight module 30 are attached by the sealant 40. While not affecting the bonding of the liquid crystal display panel 20 and the quantum dot composite film 10 through the second transparent adhesive layer 15, the quantum dot composite film 10 can also be bonded to the bottom of the liquid crystal display panel 20 to simplify the structure of the backlight module 30, and improve the viewing angle of the display device.

Specifically, the thickness of the second transparent adhesive layer 15 is 10 µm. In practical applications, the thickness of the second transparent adhesive layer 15 is not limited to 10 µm, but can also be 5 µm, 8 µm, 15 µm, 18 µm or 20 µm, and only needs to be greater than or equal to 5 µm, and less than or equal to 20 µm.

Specifically, both the first transparent adhesive layer 14 and the second transparent adhesive layer 15 can be any one of ultraviolet light sensitive adhesive, pressure sensitive adhesive or epoxy heat sensitive adhesive. In practical applications, at least one of the first transparent glue layer 14 and the second transparent glue layer 15 can also be replaced with a haze glue layer. At least one or more combination of diffusion particles such as TiO2, BaSO4, ZrO2, etc. can be added to the haze glue layer, to alleviate or avoid the problem of poor display, such as rainbow patterns or moiré patterns, which may be caused by the interference phenomenon due to the adhesion of different material film layers.

Furthermore, the cross section of the first prism structures 12 is a triangle or a trapezoid. The plurality of first prism structures 12 are distributed continuously or distributed at intervals on the light emerging surface of the quantum dot film layer 11.

Figure 3A:
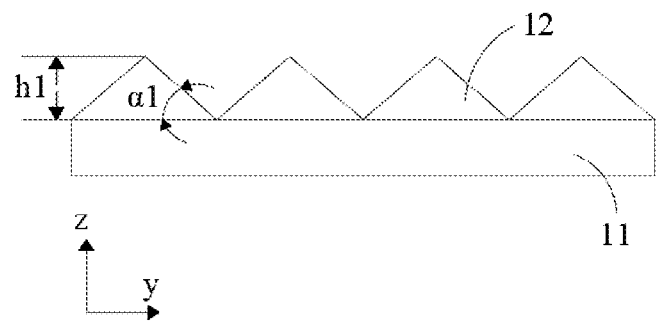
FIGS. 3a to 3d are cross-sectional structural diagrams of a first embodiment of a quantum dot composite film provided by an embodiment of this application.

As shown in FIGS. 3a to 3d, FIGS. 3a to 3d are cross-sectional structural diagrams of a first embodiment of a quantum dot composite film provided by an embodiment of this application. The cross section is a plane parallel to the short side direction y and the thickness direction z of the quantum dot composite film 10. The cross section of the first prism structure 12 in FIG. 3a is an isosceles triangle. The height h1 of the first prism structure 12 in the thickness direction z of the quantum dot composite film 10 is 20 µm. The bottom angle α1 of the first prism structure 12 is 30°.

Figure 3B:
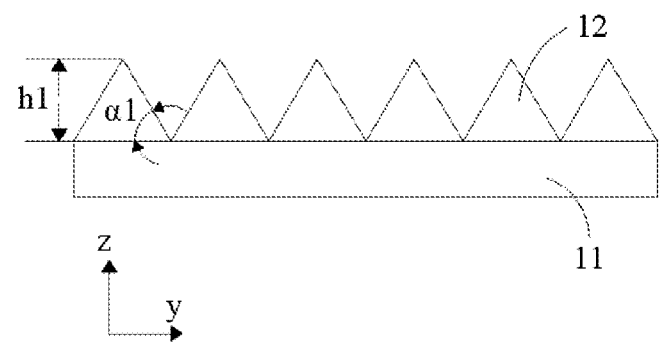

The cross section of the first prism structure 12 in FIG. 3b is an isosceles triangle. The height h1 of the first prism structure 12 in the thickness direction a3 of the quantum dot composite film 10 is 25 μm. The bottom angle α1 of the first prism structure 12 is 45°.

The first prism structures 12 in FIGS. 3a and 3b are distributed continuously on the light emerging surface of the quantum dot film layer 11, and the bottom angles of adjacent first prism structures 12 are connected to each other.

Figure 3C:
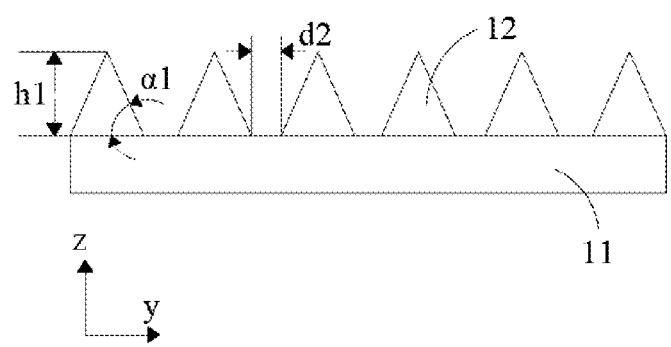

The cross section of the first prism structure 12 in FIG. 3c is an isosceles triangle. The height h1 of the first prism structure 12 in the thickness direction a3 of the quantum dot composite film 10 is 30 μm. The bottom angle α1 of the first prism structure 12 is 70°. The first prism structures 12 in FIG. 3c are distributed at intervals on the light emerging surface of the quantum dot film layer 11, and the distance d1 between any two adjacent first prism structures 12 is 30 μm.

Figure 3D:
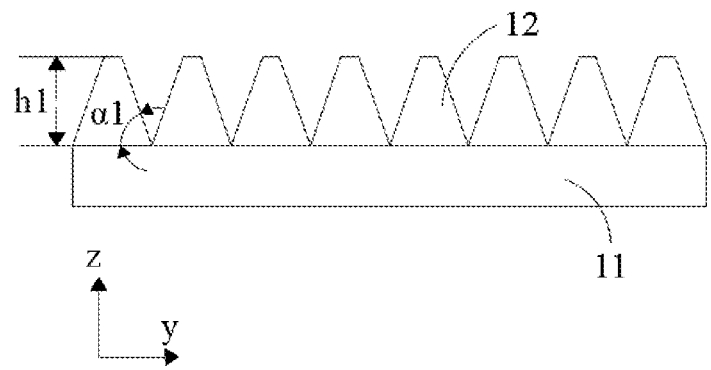

The cross section of the first prism structure 12 in FIG. 3d is an isosceles trapezoid. The height h1 of the first prism structure 12 in the thickness direction z of the quantum dot composite film 10 is 30 μm. The bottom angle α1 of the first prism structure 12 is 60°. The plurality of first prism structures 12 are distributed continuously on the light emerging surface of the quantum dot composite film 10.

In practical applications, the cross section of the first prism structure 12 is not limited to the isosceles triangle or isosceles trapezoid in the aforesaid embodiments, and may also be a right-angled triangle, other non-isosceles triangle, a right-angled trapezoid or other non-isosceles trapezoid.

In practical applications, when the plurality of first prism structures 12 are distributed at intervals on the surface of the quantum dot film layer 11, the distance between any two adjacent first prism structures 12 is not limited to the foregoing 30 μm, but can also be 10 μm, 50 μm, 70 μm, or 100 μm, etc., and only needs to be greater than 0 μm, and less than or equal to 100 μm.

In practical applications, the bottom angle α1 of the first prism structure 12 is not limited to 30°, 45°, 60° or 70° in the aforesaid embodiments, but can also be 20° or 80°, and only needs to be greater than or equal to 20°, and less than or equal to 80°.

Figure 4:
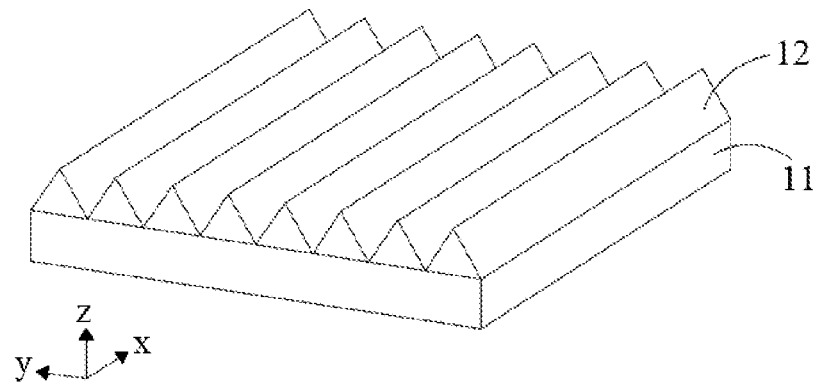
FIG. 4 is a diagram of a three-dimensional structure of a first embodiment of a quantum dot composite film provided by an embodiment of this application.

As shown in FIG. 4, FIG. 4 is a diagram of a three-dimensional structure of a first embodiment of a quantum dot composite film provided by an embodiment of this application. The length direction of the first prism structure 12 is parallel to the long side direction x of the quantum dot composite film 10. The width direction of the first prism structure 12 is parallel to the short side direction y of the quantum dot composite film 10. The plurality of first prism structures 12 are distributed continuously along the short side direction y of the quantum dot composite film 10.

Figure 5A:
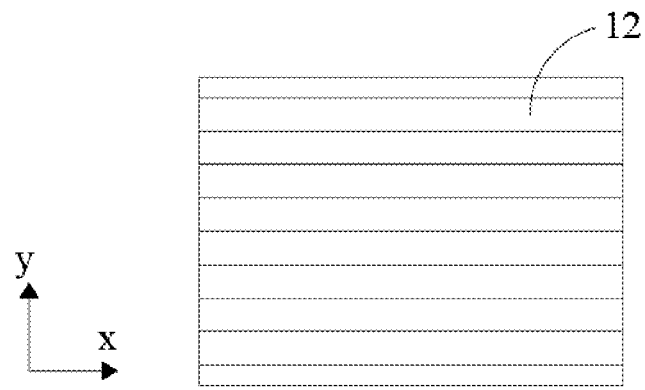
FIGS. 5a to 5c are diagrams of the arrangement direction of the first prism structures provided by an embodiment of this application.
Figure 5B:
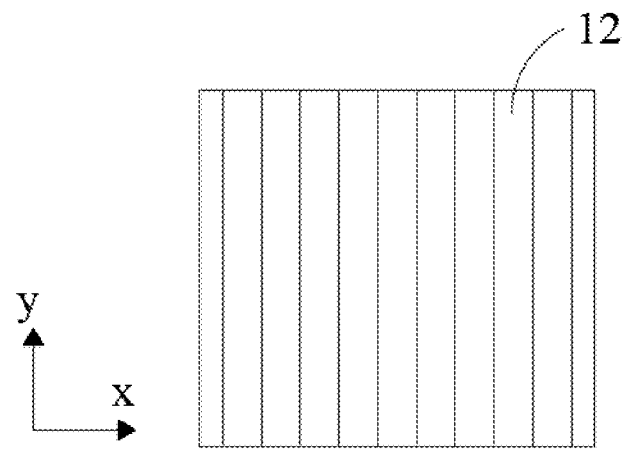
Figure 5C:
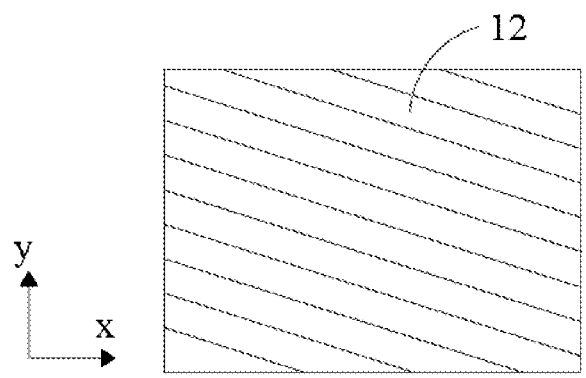

As shown in FIGS. 5a to 5c, FIGS. 5a to 5c are diagrams of the arrangement direction of the first prism structures provided by an embodiment of this application. In FIG. 5a, the length direction of the first prism structure 12 is parallel to the long side direction x of the quantum dot composite film 10. In FIG. 5b, the length direction of the first prism structure 12 is perpendicular to the long side direction x of the quantum dot composite film 10. In FIG. 5c, the length direction of the first prism structure 12 intersects with the long side direction x of the quantum dot composite film 10 to form a certain angle, which may be an acute angle or an obtuse angle.

The isosceles triangle is illustrated as the cross section of the first prism structure 12. Several first prism structures 12 are designed as shown in Table 1. The height h1 of the first prism structure 12 is unified to 35 μm, and the respective on-axis brightnesses and ½ brightness viewing angles are analyzed through optical simulation. The results are shown in Table 1:

TABLE 1

| Simulation results of optical specifications for different designs of first prism structures | | | | |
|---|---|---|---|---|
| | Taper/° | Space/μm | on-axis brightness/a.u. | ½ brightness viewing angle/° |
| control group | 45 | 0 | 9.9 | 63.9 |
| 1 | 30 | 0 | 10 | 63.6 |
| 2 | 60 | 0 | 10.2 | 63.4 |
| 3 | 70 | 0 | 10.4 | 62.5 |
| 4 | 45 | 25 | 10.9 | 62.4 |
| 5 | 45 | 50 | 11.2 | 62.1 |
| 6 | 45 | 75 | 11.3 | 61.9 |

As shown in the first to third experiments in Table 1, as the angle of the bottom angle (taper) of the first prism structure 12 gradually increases, the on-axis brightness of the display device gradually increases. Compared with the control group, in the third group of experiments, when the bottom angle is 70°, the on-axis brightness of the display device is increased by about 5%, and the ½ brightness viewing angle basically remains unchanged.

As shown in the fourth to sixth groups of experiments in Table 1, as the distance d1 between any adjacent first prism structures 12 gradually increases, the on-axis brightness of the display device gradually increases with a larger amplitude. When the distance d1 between any adjacent first prism structures 12 gradually increases to 75 μm, the on-axis brightness of the display device is increased by about 14% compared to the control group, and the ½ brightness viewing angle is slightly reduced, but it remains above 600 on one side.

Figure 6:
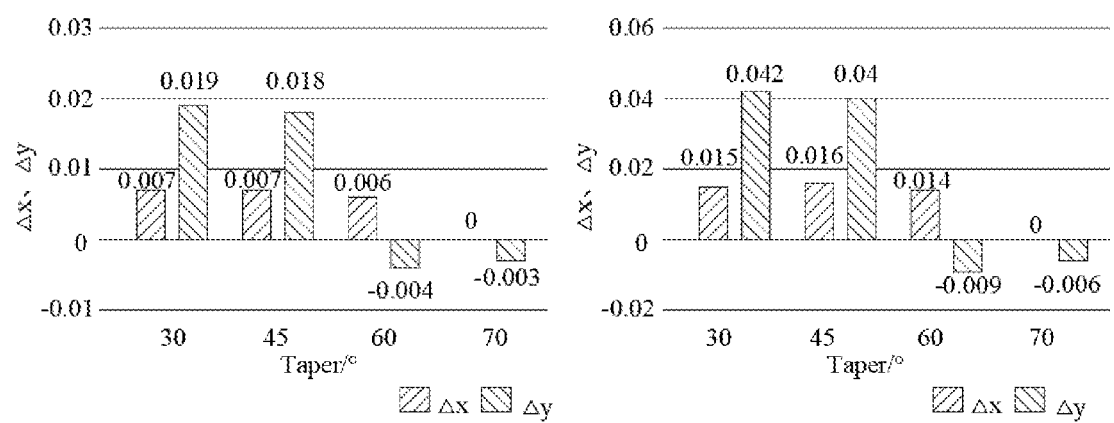
FIG. 6 is a histogram of simulation results of the large viewing angle color shift of the first prism structure with different bottom angles according to an embodiment of this application.

As shown in FIG. 6, FIG. 6 is a histogram of simulation results of the large viewing angle color shift of the first prism structure with different bottom angles according to an embodiment of this application. When the bottom angle α1 of the first prism structure 12 is increased to 60°, the deviations of the color dot y of 30° and 60° viewing angles is significantly reduced; when the bottom angle α1 of the first prism structure 12 is increased to 70°, both the perspective color dots x and y of 30° and 600 viewing angles are significantly improved.

Figure 7:
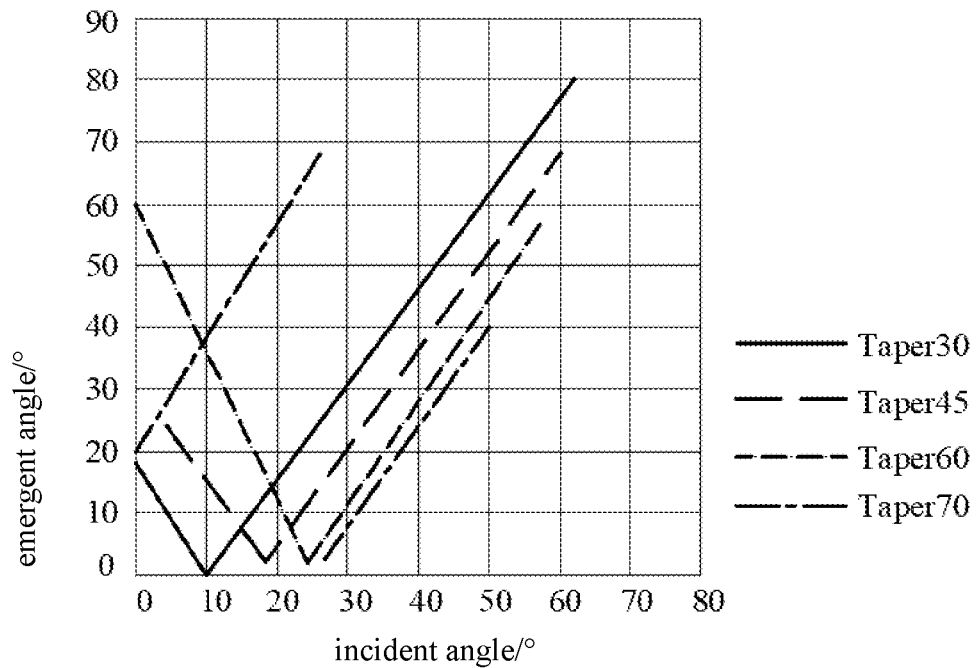
FIG. 7 is a diagram of the light incidence-emergence relationship of the first prism structure with different bottom angles according to an embodiment of this application.

As shown in FIG. 7, FIG. 7 is a diagram of the light incidence-emergence relationship of the first prism structure with different bottom angles according to an embodiment of this application. Since when the bottom angle α1 of the first prism structure 12 is increased to 70°, the first prism structure 12 refracts light from the small viewing angle (0 to 30°) to the large viewing angle to emerge, and refracts light from the medium viewing angle (0 to 30°) to the large viewing angle to emerge, and totally refracts light from the large viewing angle (above 50°) back to the quantum dot film layer 11 for emerging twice. After the light of respective viewing angles is averaged, the difference of the R, G and B light pattern is reduced, so that the color shift phenomenon is improved.

Figure 8:
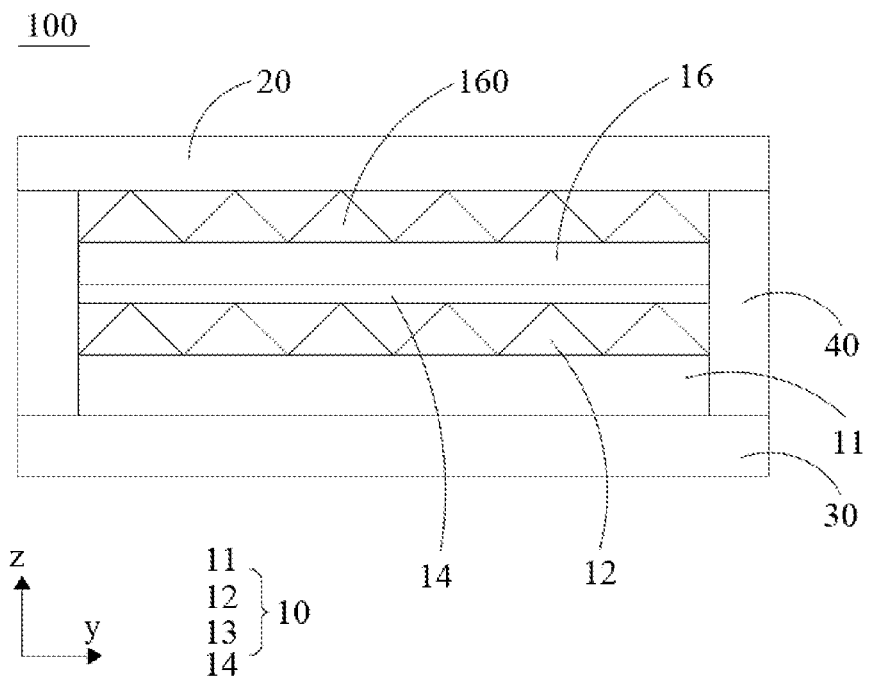
FIG. 8 is a schematic structural diagram of a third embodiment of a display device provided by an embodiment of this application.

In one embodiment, as shown in FIG. 8, FIG. 8 is a schematic structural diagram of a third embodiment of a display device provided by an embodiment of this application. The structure of the display device shown in FIG. 8 is substantially the same as that of the display device shown in FIG. 1, except that the quantum dot composite film 10 in the display device shown in FIG. 8 does not comprise the reflective polarizer 13, but comprises a first optical film layer 16. The first optical film layer 16 is disposed on a side of the first prism structures 12 away from the quantum dot film layer 11. The surface of the first optical film layer 16 away from the quantum dot film layer 11 comprises a plurality of second prism structures 160.

The first optical film layer 16 is attached to the surface of the first prism structures 12 away from the quantum dot film layer 11 through the first transparent adhesive layer 14. The quantum dot film layer 11 may be attached to the surface of the backlight module 30 facing the liquid crystal display panel 20.

Figure 9:
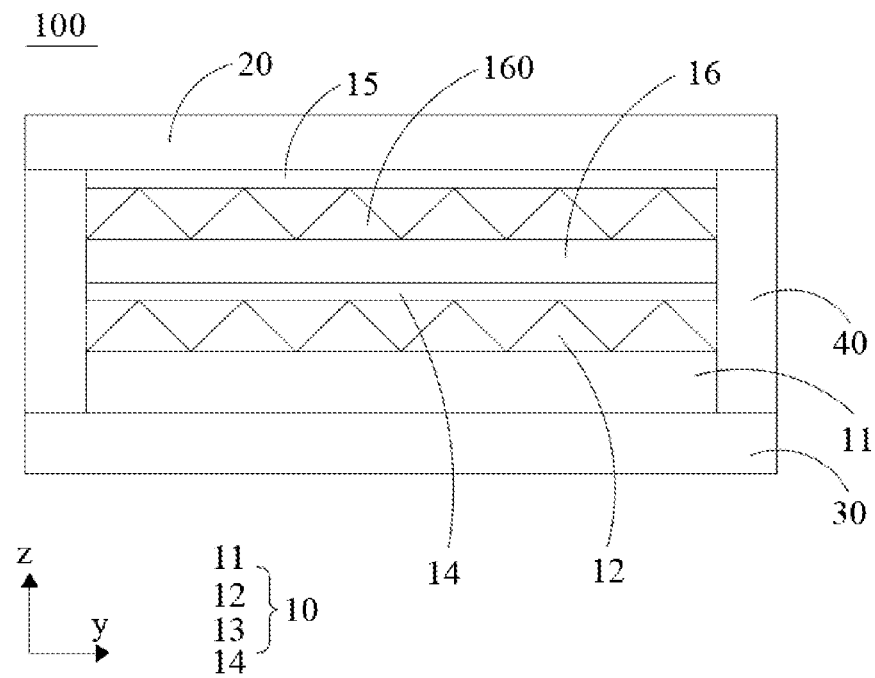
FIG. 9 is a schematic structural diagram of a fourth embodiment of a display device provided by an embodiment of this application.

In one embodiment, as shown in FIG. 9, FIG. 9 is a schematic structural diagram of a fourth embodiment of a display device provided by an embodiment of this application. The structure of the display device shown in FIG. 9 is substantially the same as that of the display device shown in FIG. 8, except that the quantum dot film layer 11 in the display device shown in FIG. 9 is not attached to the surface of the backlight module 30 facing the liquid crystal display panel 20. The surface of the first optical film layer 16 facing the liquid crystal display panel 20 can be attached to the bottom surface of the liquid crystal display panel 20 through the second optical adhesive layer 15.

Specifically, as shown in FIGS. 8 and 9, the first prism structure 12 can form a plurality of air gaps between the quantum dot film layer 11 and the first optical film layer 16. After the light emerges from the first prism structure 12 on the light emerging surface of the quantum dot film layer 11, the first light collection and refraction will occur in the process of passing through the air gap and then entering the first optical film layer 16. Thus, the angle between the light entering the first optical film layer 16 and the thickness direction z of the quantum dot composite film 10 is reduced.

When the light emerges from the second prism structure 160 on the surface of the first optical film layer 16, the second light collection and refraction occurs. Compared with the light in the first optical film layer 16, the angle between the light after emerging from the second prism structure 160 and the thickness direction z of the quantum dot composite film 10 is reduced, so that the emerging angle of the light is reduced. Accordingly, the amount of light emerged in the super-large viewing angle (>60°) range can be reduced, and the amount of light emerged in the smaller viewing angle range can be increased. Then, the on-axis brightness of the display panel is improved, and the problem of light leakage of the display panel in the large viewing angle of the dark state is improved.

The control experiments are established by using the quantum dot composite film particles in the display device shown in FIG. 8 or FIG. 9. The quantum dot composite layer 10 of the experimental group comprises a quantum dot film layer 11, a first prism structure 12 and a first optical film layer 16. The quantum dot composite layer 10 of the control group only comprises the quantum dot film layer 11 and the first optical film layer 16.

Figure 10:
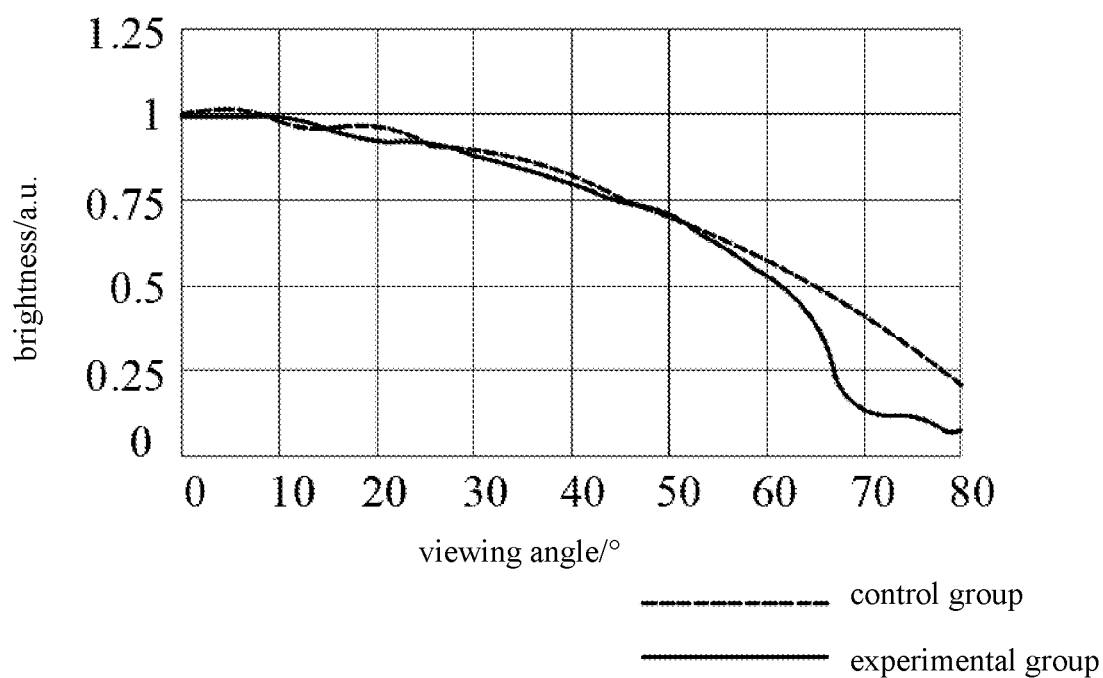
FIG. 10 is a diagram of the comparison of the emerged light patterns of the experimental group and the control group of dots provided in an embodiment of this application.

As shown in FIG. 10, FIG. 10 is a diagram of the comparison of the emerged light patterns of the experimental group and the control group of dots provided in an embodiment of this application. When the viewing angle is between 0 and 60°, the brightness of the experimental group and the control group are almost the same; when the viewing angle is greater than 60°, the brightness curve of the experimental group is significantly greater than the brightness curve of the control group, and the brightness of the experimental group is significantly lower than that of the control group.

TABLE 2 optical specification data of experimental group and control group

|  | bright state | dark state | contrast |
| --- | --- | --- | --- |
| control group | 55.20 nit | 0.0243 nit | 2271 |
| experimental group | 78.18 nit | 0.0192 nit | 4071 |

As shown in Table 2, Table 2 is the optical specification data table of the experimental group and the control group provided in the embodiment of this application. Compared with the control group, the on-axis brightness of the experimental group is increased by 41.8%, the dark state brightness is decreased by 21.0%, and the contrast is increased by 79%.

Combining FIG. 10 and Table 2, it can be seen that adding the first prism structures 12 between the quantum dot film layer 11 and the first optical film layer 16 can effectively increase the on-axis brightness of the display device and improve the light leakage of the display device in the large viewing angle of the dark state, so as to improve the contrast of the display device.

Furthermore, the cross section of the second prism structures 160 is a triangle or a trapezoid. The bottom angle of each second prism structure 160 is the same, and the bottom angle of the second prism structure 160 is greater than or equal to 20°, and less than or equal to 80°.

As shown in FIGS. 11a to 11d, FIGS. 11a to 11d are cross-sectional structural diagrams of a second embodiment of a quantum dot composite film provided by an embodiment of this application.

Figure 11A:
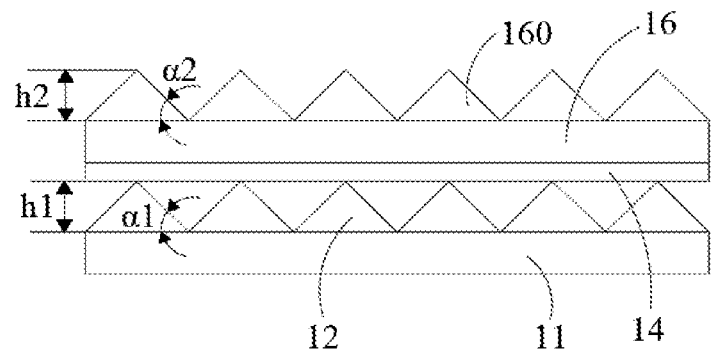
FIGS. 11a to 11d are cross-sectional structural diagrams of a second embodiment of a quantum dot composite film provided by an embodiment of this application.

The cross sections of the first prism structure 12 and the second prism structure 160 in FIG. 11a are both isosceles triangles. The plurality of first prism structures 12 are distributed continuously on the light emerging surface of the quantum dot film layer 11, and the plurality of second prism structures 160 are distributed continuously on the surface of the first optical film layer 16. The height h1 of the first prism structure 12 is 20 μm. The bottom angle α1 of the first prism structure 12 is 30°. The height h2 of the second prism structure 160 is 20 μm. The bottom angle α2 of the second prism structure 160 is 30°.

Figure 11B:
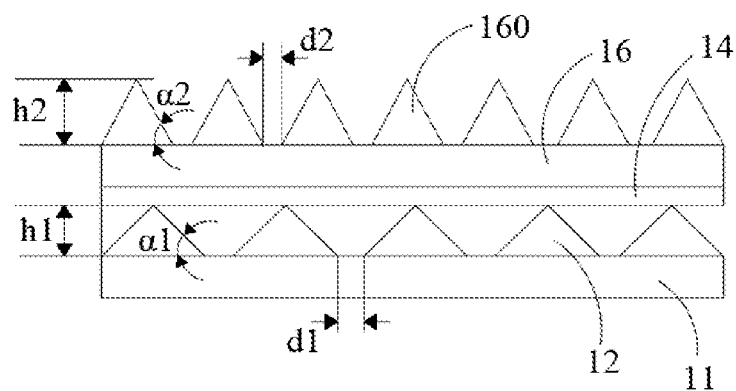

The cross sections of the first prism structure 12 and the second prism structure 160 in FIG. 11b are both isosceles triangles. The plurality of first prism structures 12 are distributed at intervals on the light emerging surface of the quantum dot film layer 11, and the plurality of second prism structures 160 are distributed at intervals on the surface of the first optical film layer 16. The height h1 of the first prism structure 12 is 25 μm. The bottom angle α1 of the first prism structure 12 is 60°. The distance d1 between any adjacent first prism structures 12 is 30 μm. The height h2 of the second prism structure 160 is 25 μm. The bottom angle α2 of the second prism structure 160 is 45°. The distance d2 between any adjacent second prism structures 160 is 50 μm.

Figure 11C:
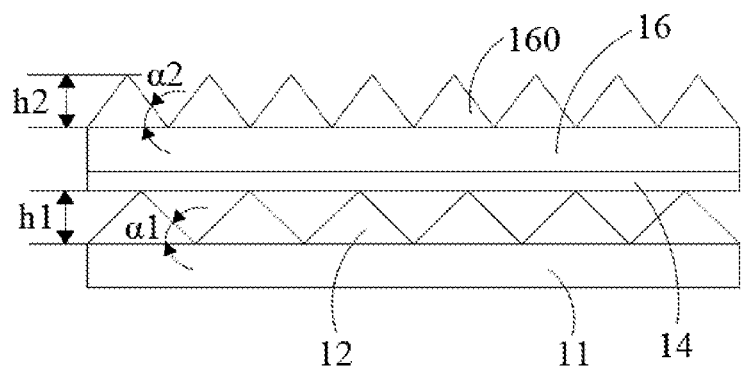
Figure 11D:
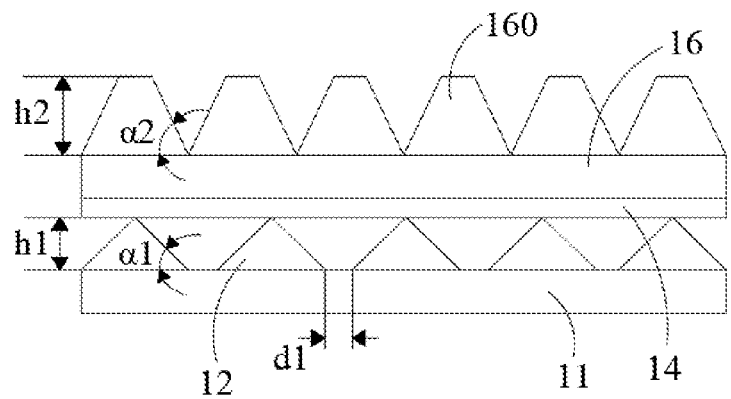

The cross sections of the first prism structure 12 and the second prism structure 160 in FIG. 11c are both isosceles triangles. The plurality of first prism structures 12 are distributed continuously on the light emerging surface of the quantum dot film layer 11, and the plurality of second prism structures 160 are distributed continuously on the surface of the first optical film layer 16. The height h1 of the first prism structure 12 is 30 μm. The bottom angle α1 of the first prism structure 12 is 45°. The height h2 of the second prism structure 160 is 30 μm. The bottom angle α2 of the second prism structure 160 is 60°.

The cross section of the first prism structure 12 is an isosceles triangle and the cross section of the second prism structure 160 is an isosceles trapezoid in FIG. 11b. The plurality of first prism structures 12 are distributed at intervals on the light emerging surface of the quantum dot film layer 11, and the plurality of second prism structures 160 are distributed continuously on the surface of the first optical film layer 16. The height h1 of the first prism structure 12 is 30 μm. The bottom angle α1 of the first prism structure 12 is 70°. The distance between any adjacent first prism structures 12 is 25 μm. The height h2 of the second prism structure 160 is 30 μm. The bottom angle α2 of the second prism structure 160 is 45°.

In practical applications, the height h1 of the first prism structure 12 may also be 10 μm or 50 μm, etc., and only needs to be greater than or equal to 10 μm, and less than or equal to 50 μm. The height h2 of the second prism structure 160 may also be 10 μm or 50 μm, etc., and only needs to be greater than or equal to 10 μm, and less than or equal to 50 μm.

When the plurality of second prism structures 160 are distributed at intervals, the distance d2 between any two adjacent second prism structures 160 is not limited to the foregoing 25 μm or 50 μm in the aforesaid embodiments, but can also be 10 μm, 30 μm, 70 μm, or 100 μm, etc., and only needs to be greater than 0 μm, and less than or equal to 100 μm.

In practical applications, the bottom angle α2 of the second prism structure 160 can also be 20°, 50° or 80°, and only needs to be greater than or equal to 200 and less than or equal to 80°.

Six groups of experiments as shown in Table 3 are designed. Through optical simulation and experimental verification, the different prism structure designs of the quantum dot composite film 10 possess different optical specifications.

TABLE 3 design parameters and optical specifications of experimental groups

| experimental group | first prism structure Taper/° | second prism structure Taper/° | on-axis brightness/a.u. | ½ brightness viewing angle/° |
|---|---|---|---|---|
| 1 | 30 | 45 | 12.34 | 55.3 |
| 2 | 45 | 45 | 13 | 55.2 |
| 3 | 60 | 45 | 13.6 | 54.4 |
| 4 | 45 | 30 | 12.2 | 61 |
| 5 | 45 | 45 | 13 | 55.2 |
| 6 | 45 | 60 | 12.72 | 45.8 |

Figure 12:
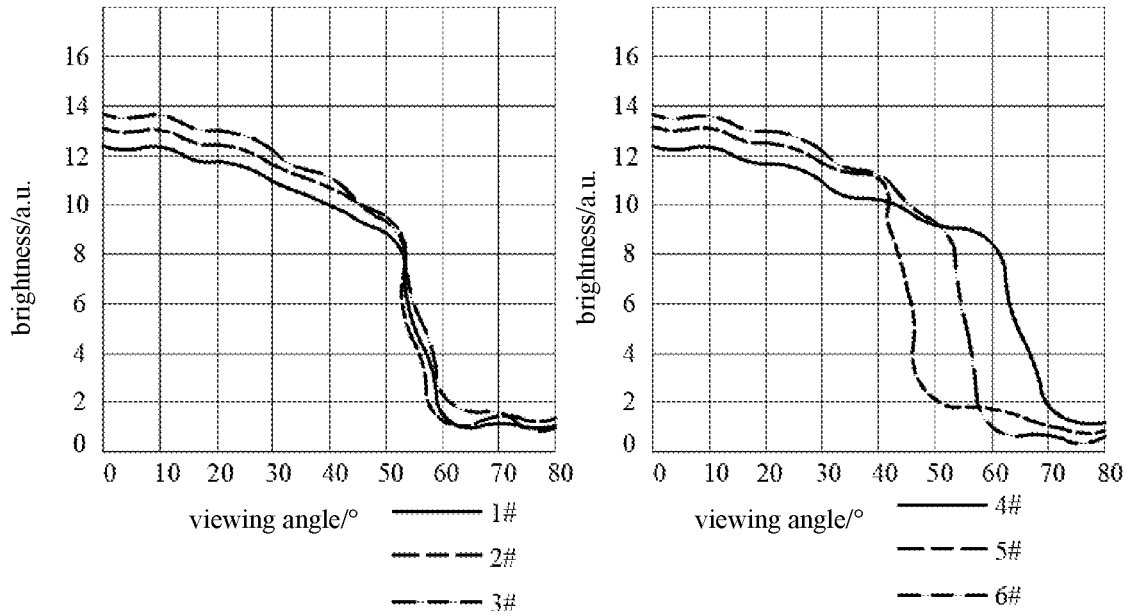
FIG. 12 is a diagram of the emerged light pattern corresponding to each experimental group in Table 3 provided by the embodiment of this application.

Combined with FIG. 12 and Table 3, FIG. 12 is a diagram of the emerged light pattern corresponding to each experimental group in Table 3 provided by the embodiment of this application. As shown in the experimental groups 1 to 3 in FIG. 12 and Table 3, as the bottom angle α1 of the first prism structure 12 gradually increases, the on-axis brightness of the display device gradually increases, and the ½ brightness viewing angle basically remains unchanged. It can be seen that by changing the design of the first prism structure 12 on the light emerging surface of the quantum dot film layer 11, the energy efficiency of the display device can be increased by about 10%, and the ½ brightness viewing angle can be kept basically unchanged.

As shown in the experimental groups 4 to 6 in FIG. 12 and Table 3, as the bottom angle α2 of the second prism structure 160 gradually increases, the ½ brightness viewing angle gradually decreases, and the magnitude of the decrease is greater. It can be seen that by changing the design of the second prism structure 160, the one side ½ brightness viewing angle of the display device can be adjusted to be 40° to 60°. Therefore, the first prism structure 12 in the quantum dot composite film 10 mainly affects the energy efficiency of the display device, and the second prism structure 160 of the first optical film layer 16 mainly affects the viewing angle of the display device.

In one embodiment, the second prism structure 160 adopts a double Taper structure design, that is, the second prism structures 160 comprise a first sub-prism structure 161 and a second sub-prism structure 162. The second sub-prism structure 162 is interspersedly arranged between the first sub-prism structures 161 or arranged on a side of the first sub-prism structure 161. The bottom angle α21 of the first sub-prism structure 161 is different from the bottom angle α22 of the second sub-prism structure 162.

In an embodiment, the cross sections of the first sub-prism structure 161 and the second sub-prism structure 162 are the same. The height of the first sub-prism structure 161 and the height of the second sub-prism structure 162 in the thickness direction z of the quantum dot composite film 10 are the same, and the number of the first sub-prism structure 161 and the number of the second sub-prism structure 162 are the same.

Figure 13A:
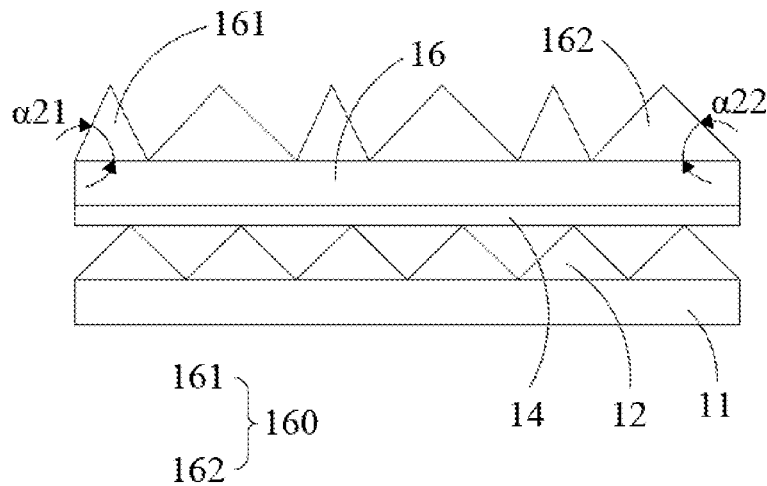
FIGS. 13a to 13d are cross-sectional structural diagrams of a third embodiment of a quantum dot composite film provided by an embodiment of this application.

As shown in FIGS. 13a to 13d, FIGS. 13a to 13d are cross-sectional structural diagrams of a third embodiment of a quantum dot composite film provided by an embodiment of this application. In FIG. 13a, the cross sections of the first sub-prism structure 161 and the second sub-prism structure 162 are both isosceles triangles. The height are both 20 μm. The bottom angle α21 of the first sub-prism structure 161 is 70°. The bottom angle α22 of the second sub-prism structure 162 is 45°. The ratio of the number of the first sub-prism structure 161 to the number of the second sub-prism structure 162 is 1:1.

In an embodiment, the number of the first sub-prism structure 161 and the number of the second sub-prism structure 162 are different.

Figure 13B:
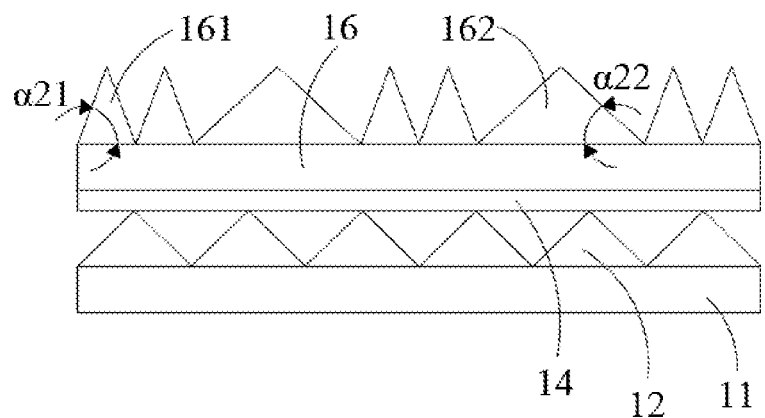

As shown in FIG. 13b, the cross sections of the first sub-prism structure 161 and the second sub-prism structure 162 are both isosceles triangles. The height are both 20 μm. The bottom angle α21 of the first sub-prism structure 161 is 60°. The bottom angle α22 of the second sub-prism structure 162 is 45°. The ratio of the number of the first sub-prism structure 161 to the number of the second sub-prism structure 162 is 2:1. Two adjacent first sub-prism structures 161 are arranged between two adjacent second sub-prism structures 162.

In practical applications, the ratio of the number of the first sub-prism structures 161 to the number of the second sub-prism structures 162 is not limited to the 2:1 in the foregoing embodiment, but may also be 3:1, 1:2, 1:3, etc.

Figure 13C:
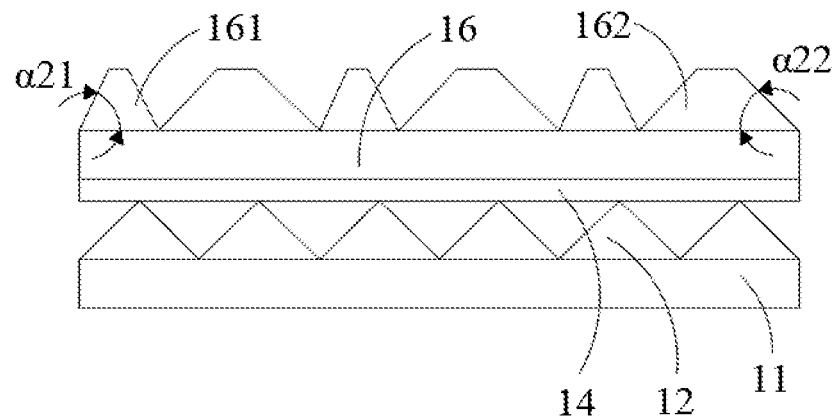

As shown in FIG. 13c, the cross sections of the first sub-prism structure 161 and the second sub-prism structure 162 are both isosceles trapezoids. The height are both 30 μm. The bottom angle α21 of the first sub-prism structure 161 is 60°. The bottom angle α22 of the second sub-prism structure 162 is 30°. The ratio of the number of the first sub-prism structure 161 to the number of the second sub-prism structure 162 is 1:1.

In an embodiment, the cross sections of the first sub-prism structure 161 and the second sub-prism structure 162 are different.

Figure 13D:
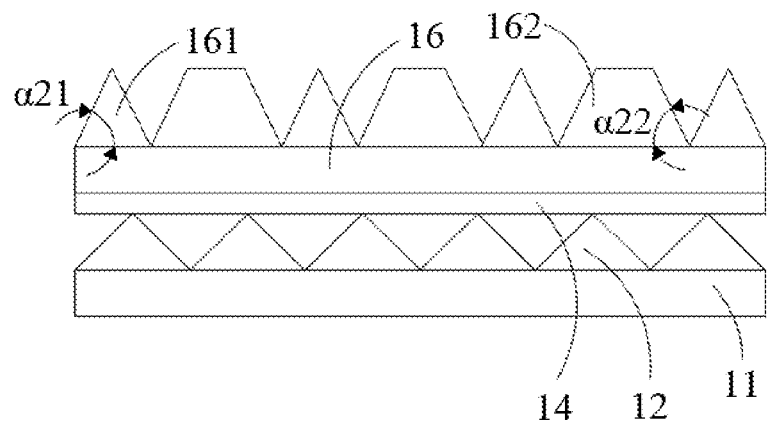

As shown in FIG. 13d, the cross section of the first sub-prism structure 161 is an isosceles triangle and the second sub-prism structure 162 is an isosceles trapezoid.

The heights of the first sub-prism structure 161 and the second sub-prism structure 162 are both 30 μm. The bottom angle α21 of the first sub-prism structure 161 is 70°. The bottom angle α22 of the second sub-prism structure 162 is 70°. The ratio of the number of the first sub-prism structure 161 to the number of the second sub-prism structure 162 is 1:1. In other embodiments, the cross section of the first sub-prism structure 161 may also be an isosceles trapezoid, and the cross section of the second sub-prism structure 162 may also be an isosceles triangle.

In practical applications, the bottom angle (taper) of the first sub-prism structure 161 may also be 45°, 50°, 80°, etc., and it only needs to be greater than or equal to 45°, and less than or equal to 80°. The bottom angle (taper) of the second sub-prism structure 162 may also be 100, 20°, 40°, etc., and it only needs to be greater than or equal to 10°, and less than or equal to 45°. The height of the first sub-prism structure 161 may be the same as the height of the second sub-prism structure 162, or may be larger or smaller than the height of the second sub-prism structure 162.

Eight groups of experiments as shown in Table 4 are designed. The cross sections and bottom angles of the first sub-prism structure 161 and the second sub-prism structure 162 in the control groups are the same, and the cross sections of the first sub-prism structure 161 and the second sub-prism structure 162 in the experimental groups are the same but the bottom angles are different.

TABLE 4

Double Taper structure Gamma Shift improvement results

| | control group | | | | experimental group | | | |
|---|---|---|---|---|---|---|---|---|
| | gray scale | | | | | | | |
| angle | 51 20% | 102 40% | 153 60% | 204 80% | 51 20% | 102 40% | 153 60% | 204 80% |
| 0 | 0.00% | 0.00% | 0.00% | 0.00% | 0.00% | 0.00% | 0.00% | 0.00% |
| 10 | 0.66% | 0.99% | 0.66% | −24.81% | 0.63% | 0.96% | 0.69% | −0.22% |
| 20 | 2.60% | 3.82% | 2.51% | −22.93% | 2.15% | 3.23% | 2.28% | −0.74% |
| 30 | 5.62% | 8.02% | 5.10% | −20.05% | 4.37% | 6.37% | 4.37% | −1.48% |
| 40 | 9.56% | 13.17% | 8.07% | −17.07% | 6.15% | 8.64% | 5.74% | −2.02% |
| 50 | 13.39% | 17.81% | 10.58% | −13.42% | 6.02% | 8.17% | 5.29% | −1.86% |
| 60 | 16.44% | 21.24% | 12.41% | −9.82% | 4.91% | 6.48% | 4.14% | −1.36% |
| 70 | 15.97% | 20.28% | 11.84% | −5.86% | 3.48% | 4.51% | 2.88% | −0.83% |

Figure 14:
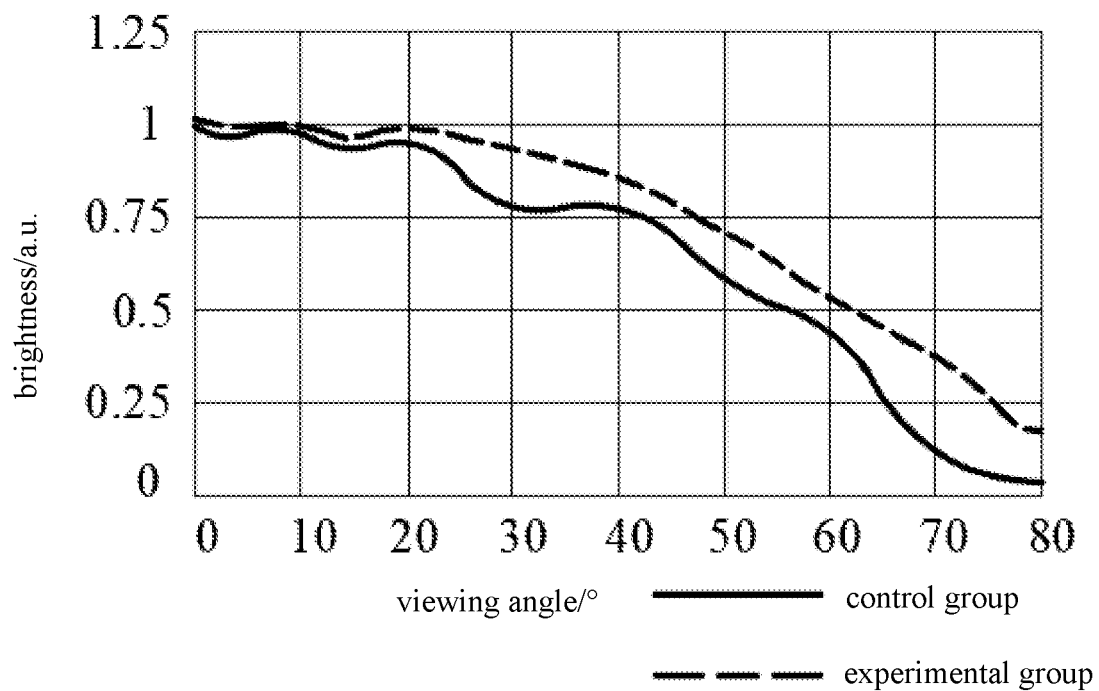
FIG. 14 is a diagram of the comparison of the emerged light patterns of the double prism structure provided by the embodiment of this application.

FIG. 14 is a diagram of the comparison of the emerged light patterns of the double prism structure provided by the embodiment of this application. Combining FIG. 14 and Table 4, it can be seen that in the experimental groups, the first sub-prism structure 161 and the second sub-prism structure 162 have different bottom angles, which can make the emerged light patterns of the emerged light show a stepwise change, to reduce the amount of light emerged from the large angle (40° to 60°), thereby reducing the brightness of the specific viewing angle and reducing the problem of light leakage at the large viewing angle to improve the energy efficiency of the display device. At the same time, the amount of gamma shift of different gray levels under large viewing angles can be reduced, thereby improving the gamma shift under different gray levels.

Figure 15:
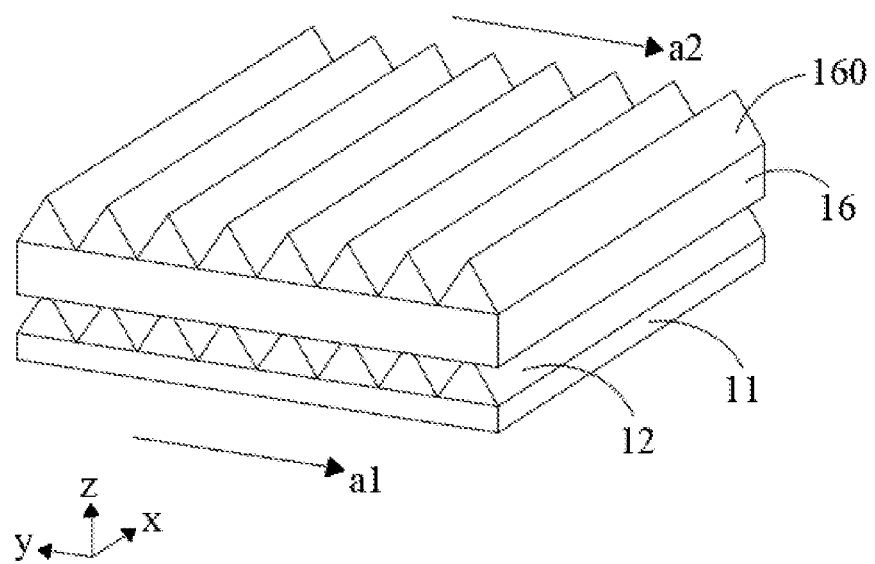
FIG. 15 is a diagram of a three-dimensional structure of the second embodiment of a quantum dot composite film provided by an embodiment of this application.

In one embodiment, as shown in FIG. 15, FIG. 15 is a diagram of a three-dimensional structure of the second embodiment of a quantum dot composite film provided by an embodiment of this application. The plurality of first prism structures 12 are distributed continuously along the first direction a1, and the plurality of second prism structures 160 are distributed continuously along the second direction a2. The first direction a1 and the second direction a2 are parallel, and both are parallel to the long side direction x of the quantum dot composite film 10 and perpendicular to the short side direction y of the quantum dot composite film 10.

Figure 16:
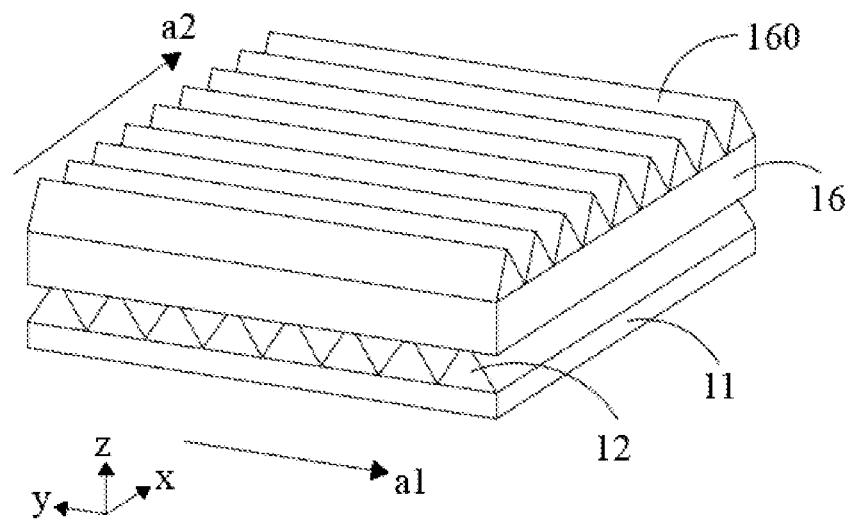
FIG. 16 is a diagram of another three-dimensional structure of the second embodiment of a quantum dot composite film provided by an embodiment of this application.

In one embodiment, as shown in FIG. 16, FIG. 16 is a diagram of another three-dimensional structure of the second embodiment of a quantum dot composite film provided by an embodiment of this application. The first prism structures 12 are distributed continuously along the first direction a1, the second prism structures 160 are distributed continuously along the second direction a2. The first direction a1 is perpendicular to the second direction a2. The first direction a1 is parallel to the long side direction x of the quantum dot composite film 10. The second direction a2 is perpendicular to the long side direction x of the quantum dot composite film 10. In practical applications, the first direction a1 and the second direction a2 may not be perpendicular, but may intersect to form a certain angle, such as 10°, 20°, 45°, 60° 70° or 80°.

In one embodiment, the bottom angle α21 of the first sub-prism structure 161 may be 70°, and the bottom angle α22 of the second sub-prism structure 162 may be 30°. Based on the angles of the bottom angle α21 of the first sub-prism structure 161 and the bottom angle α22 of the second sub-prism structure 162 in this embodiment, four control experimental groups were established. The refractive indexes of the first prism structures 12 in the four control experimental groups are different, which are 1.43, 1.50, 1.57 and 1.64, respectively.

TABLE 5 optical specification data of respective experimental groups

| experimental group | α1 | α2 | refractive index | viewing angle improvement range |
|---|---|---|---|---|
| 1 | 70° | 30° | 1.43 | 40°~65° |
| 2 | 70° | 30° | 1.50 | 35°~60° |
| 3 | 70° | 30° | 1.57 | 25°~50° |
| 4 | 70° | 30° | 1.64 | 20°~45° |

As shown in Table. 5, Table 5 shows optical specification data of respective experimental groups. When the bottom angle of the first prism structure 12 and the bottom angle of the second prism structure 160 remain constant, as the refractive index of the first prism structure 12 increases, the viewing angle improvement range gradually decreases.

Figure 17:
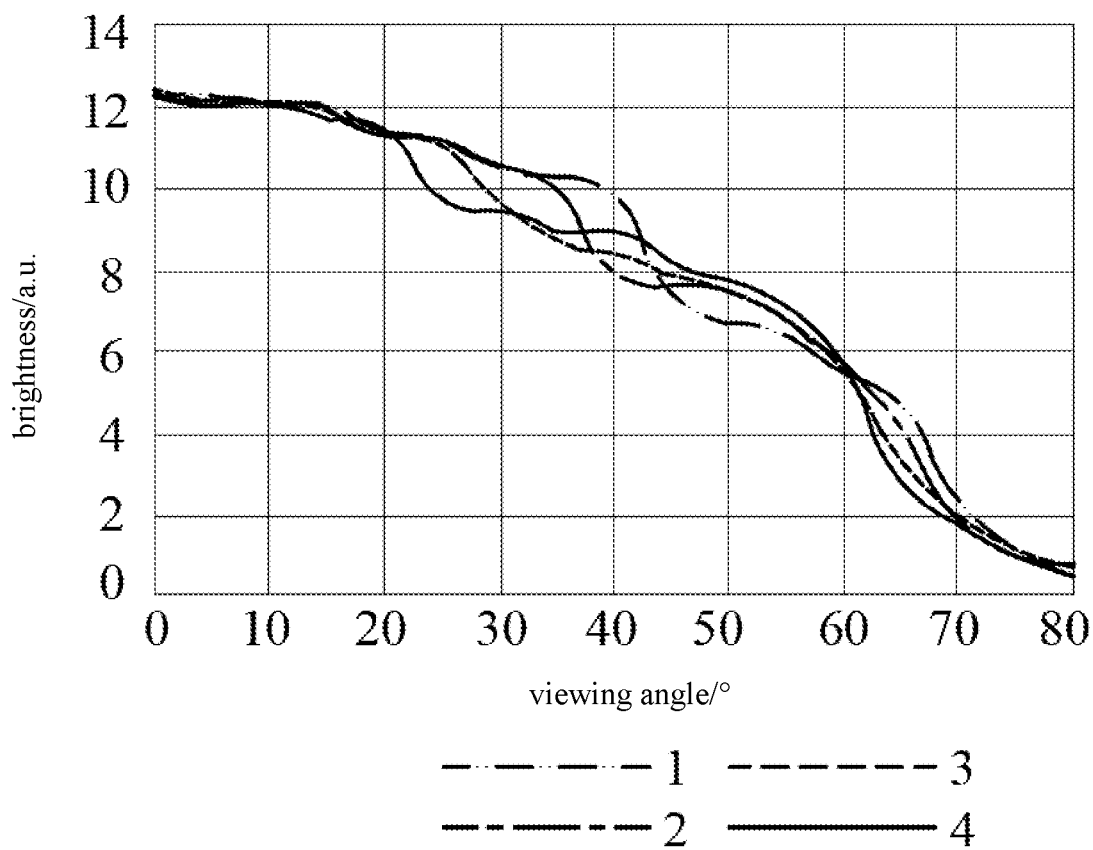
FIG. 17 is a diagram of the comparison of the emerged light patterns of respective experimental groups provided by the embodiments of this application.

As shown in FIG. 17, FIG. 17 is a diagram of the comparison of the emerged light patterns of respective experimental groups provided by the embodiments of this application. Since the two-prisms structure of stacking the first prism structure 12 and the second prism structure 160 is designed, each of the four experimental groups possesses two inflection points in the light patterns of the emerged light. As the viewing angle increases, the brightness curve of each experimental group suddenly increases as passing the inflection point. In the four experimental groups, as the refractive index of the first prism structure 12 increases, the inflection point moves toward the direction of low angle. It can be seen that the larger the refractive index of the first prism structure 12, the smaller the viewing angle range generated by the inflection point. This is because as the refractive index of the first prism structure 12 increases, the refraction effect of the first prism structure 12 to the light is enhanced, and the emerging angle of the light becomes smaller.

Figure 18:
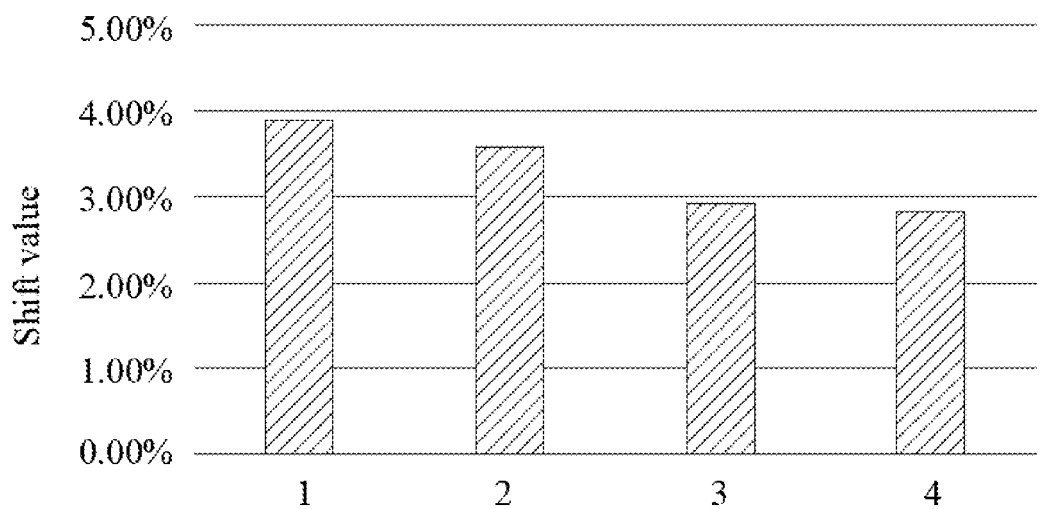
FIG. 18 is a histogram of the Gamma shift values of the 4 experimental groups in Table 5 at 102 gray scale and 20° viewing angle provided by the embodiments of this application.

As shown in FIG. 18, FIG. 18 is a histogram of the Gamma shift values of the 4 experimental groups in Table 5 at 102 gray scale and 20° viewing angle provided by the embodiments of this application. With the increase of the refractive index of the first prism structure 12, the gamma shift value under this condition will decrease accordingly. The No. 3 and No. 4 experimental groups can improve the gamma shift index to within the specification (that is, below 3%). In practical applications, materials with different refractive indices can be selected for the first prism structure 12 according to different optical specifications.

In the embodiment of this application, the refractive index of the first prism structure 12 is 1.4. In practical applications, the refractive index of the first prism structure 12 is not limited to 1.4 in the foregoing embodiment, but can also be 1.3, 1.5, 1.6, or 1.7, etc., and only needs to be greater than or equal to 1.3, and less than or equal to 1.7.

Figure 19:
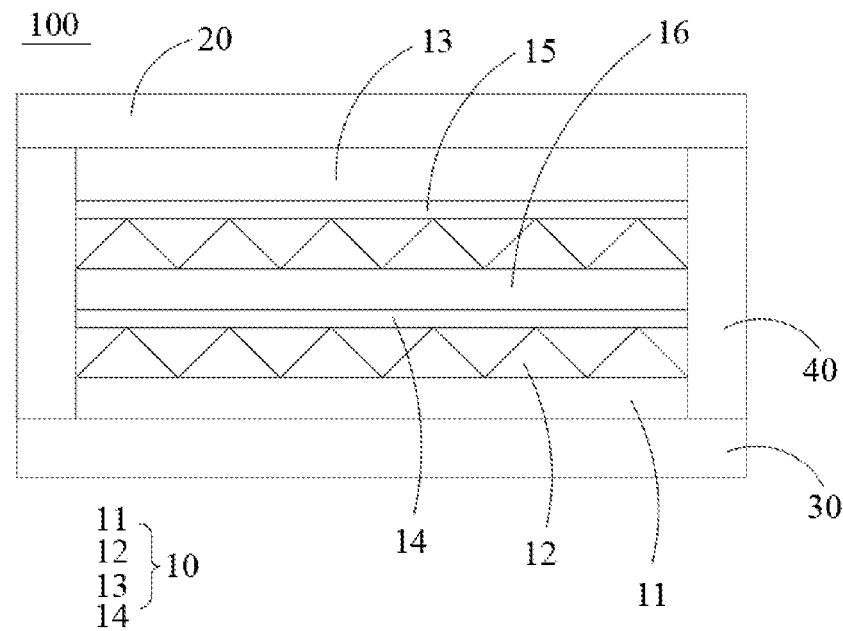
FIG. 19 is a schematic structural diagram of a fifth embodiment of a display device provided by an embodiment of this application.

Furthermore, as shown in FIG. 19, FIG. 19 is a schematic structural diagram of a fifth embodiment of a display device provided by an embodiment of this application. The structure of the display device shown in FIG. 19 is substantially the same as that of the display device shown in FIG. 8, except that the quantum dot composite film 10 in the display device shown in FIG. 19 further comprises a reflective polarizer 13, and the reflective polarizer 13 is disposed on a side of the first optical film layer 16 away from the quantum dot film layer 11.

The reflective polarizer 13 is attached to the surface of the first optical film layer 16 away from the quantum dot film layer 11 through the second transparent glue layer 15.

Figure 20:
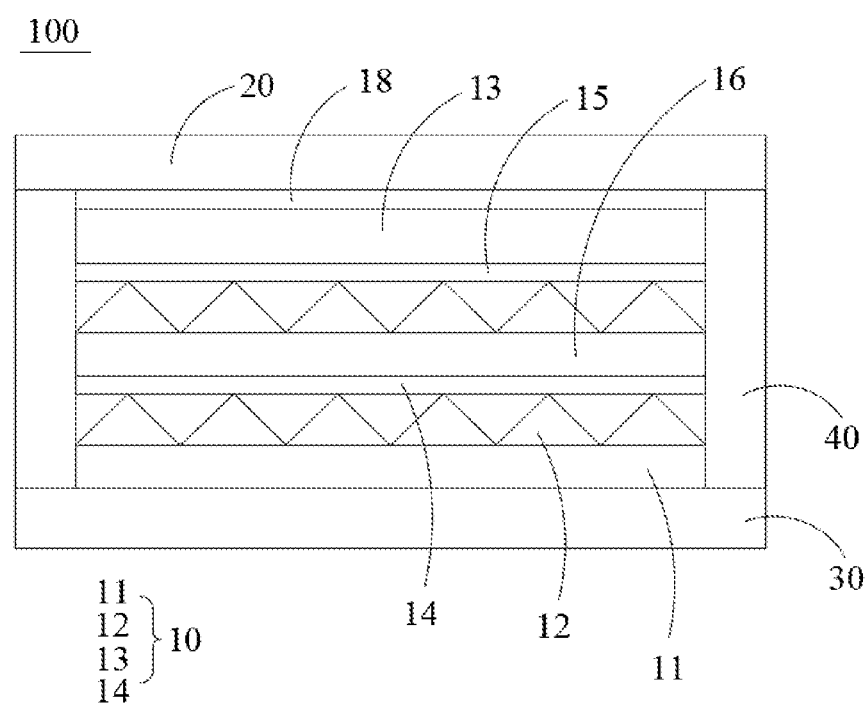
FIG. 20 is a schematic structural diagram of a sixth embodiment of a display device provided by an embodiment of this application.

In one embodiment, as shown in FIG. 20, FIG. 20 is a schematic structural diagram of a sixth embodiment of a display device provided by an embodiment of this application. The structure of the display device shown in FIG. 20 is substantially the same as that of the display device shown in FIG. 9, except that the quantum dot composite film 10 in the display device shown in FIG. 20 comprises a quantum dot film layer 11, a first prism structure 12, a first optical film layer 16 and a reflective polarizer 13. The surface of the reflective polarizer 13 away from the first optical film layer 16 is attached to the surface of the liquid crystal display panel 20 close to the backlight module 30 through the haze glue layer 18. The use of the haze glue layer 18 can improve the problem of poor display, such as rainbow patterns or moiré patterns, which may be caused by the interference phenomenon due to the adhesion of different material film layers.

The benefits of the embodiment of the present application are: The embodiment of the present application provides a display device. The display device comprises a quantum dot composite film, a liquid crystal display panel and a backlight module. The quantum dot composite film comprises a quantum dot film layer, and a light emerging surface of the quantum dot film layer is provided with a plurality of first prism structures. The first prism structure is employed to adjust the emerging angle of light, so that more light emerges from smaller angles, thereby improving the front view brightness of the display device, and improving or avoiding the problem of light leakage of the display device in the large viewing angle of the dark state for improving the contrast of the display device.

In summary, although the above preferred embodiments of the present application are disclosed, the foregoing preferred embodiments are not intended to limit the invention, those skilled in the art can make various kinds of alterations and modifications without departing from the spirit and scope of the present application. Thus, the scope of protection of the present application is defined by the scope of the claims.

What is claimed is:

1. A display device, comprising:
   a backlight module;
   a liquid crystal display panel arranged on a light emerging side of the backlight module; and
   a quantum dot composite film arranged between the liquid crystal display panel and the backlight module, wherein the quantum dot composite film comprises:
   a quantum dot film layer; and
   a plurality of first prism structures arranged on a light emerging surface of the quantum dot film layer;
   wherein a material of each of the plurality of first prism structures comprises transparent polymer and inorganic particles;
   wherein the quantum dot composite film further comprises a first optical film layer disposed on a side of the plurality of first prism structures away from the quantum dot film layer;
   wherein a surface of the first optical film layer away from the quantum dot film layer comprises a plurality of second prism structures;
   wherein a cross section of each of the plurality of second prism structures is a triangle or a trapezoid;
   wherein each of the plurality of second prism structures comprises a plurality of first sub-prism structures and a plurality of second sub-prism structures, and at least one of the plurality of second sub-prism structure is interspersedly arranged between the plurality of first sub-prism structures or arranged on a side of the plurality of first sub-prism structures; and
   wherein a bottom angle of each of the plurality of first sub-prism structures is different from a bottom angle of each of the plurality of second sub-prism structures; and/or a cross section of each of the plurality of first sub-prism structures is different from a cross section of each of the plurality of second sub-prism structures.

2. The display device according to claim 1, wherein a cross section of each of the plurality of first prism structures is a triangle or a trapezoid.

3. The display device according to claim 1, wherein the plurality of first prism structures are distributed continuously or distributed at intervals along a first direction on the light emerging surface of the quantum dot film layer.

4. The display device according to claim 3, wherein the quantum dot composite film further comprises a reflective polarizer, and the reflective polarizer is disposed on a side of the plurality of first prism structures away from the quantum dot film layer.

5. The display device according to claim 1, wherein the plurality of second prism structures are distributed continuously or distributed at intervals along a second direction on a side of the first optical film layer away from the quantum dot film layer, and the first direction is parallel to or intersects with the second direction.

6. The display device according to claim 5, wherein a distance between adjacent ones of the plurality of second prism structures is greater than 0 μm, and less than or equal to 100 μm.

7. The display device according to claim 1, wherein a bottom angle of each of the plurality of second prism structures is the same, and the bottom angle of each of the plurality of second prism structures is greater than or equal to 20°, and less than or equal to 80°.

8. The display device according to claim 1, wherein the bottom angle of each of the plurality of first sub-prism structures is greater than the bottom angle of each of the plurality of second sub-prism structures.

9. The display device according to claim 8, wherein the bottom angle of each of the plurality of first sub-prism structures is greater than 45°, and less than or equal to 80°, and the bottom angle of each of the plurality of second sub-prism structures is greater than or equal to 10°, and less than or equal to 45°.

10. The display device according to claim 1, wherein the reflective polarizer is arranged on a side of the first optical film layer away from the quantum dot film layer.

11. The display device according to claim 1, wherein the transparent polymer comprises at least one of polymethyl methacrylate, polycarbonate, polyester resin or epoxy resin, and the inorganic particles comprise at least one of $TiO_2$, $BaSO_4$ and $ZrO_2$.

12. The display device according to claim 1, wherein a refractive index of each of the plurality of first prism structures is greater than or equal to 1.3, and less than or equal to 1.7.

13. The display device according to claim 1, wherein the quantum dot film layer comprises a composite film substrate and a plurality of quantum dots distributed in the composite film substrate;
wherein a material of the composite film substrate comprises transparent polymer.

14. The display device according to claim 13, wherein a material of the transparent polymer comprises at least one of polymethyl methacrylate, polycarbonate, polyester resin or epoxy resin, and each of the plurality of quantum dots comprises a luminescent core and an inorganic protective shell layer encapsulating the luminescent core;
wherein a material of the inorganic protective shell layer comprises at least one of CdS, ZnSe, $ZnCdS_2$, ZnS and ZnO.

15. The display device according to claim 14, wherein the plurality of quantum dots comprise red light quantum dots and green light quantum dots;
wherein a material of the luminescent core of each of the red light quantum dots comprises at least one of CdSe, $Cd_2SeTe$ and InAs, and a material of the luminescent core of each of the green light quantum dots comprises at least one of $ZnCdSe_2$, InP and $Cd_2SSe$.

16. The display device according to claim 1, wherein the quantum dot composite film is attached to a side of the liquid crystal display panel facing the backlight module; or the quantum dot composite film is attached to a side of the backlight module facing the liquid crystal display panel.

17. A display device, comprising:
a backlight module;
a liquid crystal display panel arranged on a light emerging side of the backlight module; and
a quantum dot composite film arranged between the liquid crystal display panel and the backlight module, wherein the quantum dot composite film comprises:
a quantum dot film layer; and
a plurality of first prism structures arranged on a light emerging surface of the quantum dot film layer;
wherein the plurality of first prism structures are distributed continuously or distributed at intervals along a first direction on the light emerging surface of the quantum dot film layer;
wherein the quantum dot composite film further comprises a reflective polarizer, and the reflective polarizer is disposed on a side of the plurality of first prism structures away from the quantum dot film layer;
wherein the quantum dot composite film further comprises a first optical film layer disposed on a side of the plurality of first prism structures away from the quantum dot film layer;
wherein a surface of the first optical film layer away from the quantum dot film layer comprises a plurality of second prism structures;
wherein a cross section of each of the plurality of second prism structures is a triangle or a trapezoid;
wherein the plurality of second prism structures comprise a plurality of first sub-prism structures and a plurality of second sub-prism structures, and at least one of the plurality of second sub-prism structure is interspersedly arranged between the plurality of first sub-prism structures or arranged on a side of the plurality of first sub-prism structures;
wherein a bottom angle of each of the plurality of first sub-prism structures is different from a bottom angle of each of the plurality of second sub-prism structures; and/or a cross section of each of the plurality of first sub-prism structures is different from a cross section of each of the plurality of second sub-prism structures.

* * * * *